United States Patent

Tsugami

[15] 3,667,127
[45] June 6, 1972

[54] DIGITAL MICROMETER CALIPER

[72] Inventor: Taisuke Tsugami, 1-415 Shimoochiai, Shinjuku-ku, Tokyo, Japan

[22] Filed: June 4, 1970

[21] Appl. No.: 43,478

[52] U.S. Cl. .............................................33/164 R, 33/166
[51] Int. Cl. ..................................................G01b 3/18
[58] Field of Search ...................33/166, 164 R, 164 A, 165

[56] References Cited

UNITED STATES PATENTS

| | | | |
|---|---|---|---|
| 1,021,384 | 3/1912 | Smith | 33/166 |
| 1,389,028 | 8/1921 | Colburn | 33/166 |
| 2,443,126 | 6/1948 | Whitaker | 33/164 R |
| 1,210,051 | 12/1916 | Davenport | 33/166 |

*Primary Examiner*—William D. Martin, Jr.
*Attorney*—Oldham & Oldham

[57] ABSTRACT

Improvements in structure of micrometer calipers of the digital type, designed to prevent ingress of any foreign matter into the interior mechanism of the caliper and to enable the digital counter incorporated to be readily zero-adjusted as required. The component parts of the caliper, particularly of the counter mechanism, can be assembled without particular skill and the caliper service life is substantially extended with reduced maintenance.

4 Claims, 3 Drawing Figures

PATENTED JUN 6 1972  3,667,127

INVENTOR.
Taisuke Tsugami
BY Oldham & Oldham
attys.

DIGITAL MICROMETER CALIPER

This invention relates to digital or direct-reading type micrometer calipers, in which a wheel counter is incorporated for digital indication of the length measured, and is particularly concerned with the durability of such micrometer calipers and their convenience in manufacture and use.

Previously, digital type micrometer calipers have been vulnerable to different kinds of dust and other foreign matter because of their construction and have involved various troubles in use and maintenance.

Another disadvantage of previous forms of micrometer caliper of the digital type is reduction in accuracy of the digital indication, resulting from wear unavoidable with the counter mechanism as well as with the micrometer spindle and the anvil of the caliper when it is used for any substantial service period.

A further disadvantage of conventional digital micrometer calipers is that they require a considerable assembling skill for accurate digital indication.

The present invention is designed to overcome these and other difficulties experienced in conventional digital type micrometer calipers.

A principal object of the present invention is to provide a digital type micrometer caliper of an improved structure particularly designed to effectively prevent ingress of any foreign matter such as cutting or grinding oil, turning chips or abrasive grits in use of the caliper and particularly when it is used with pieces being worked.

Another object of the invention is to provide a digital type micrometer caliper of the kind described which includes means for zero adjustment of the counter mechanism and can maintain the accuracy of digital indication without necessitating any particular trouble for such adjustment.

A further object of the invention is to provide a digital micrometer caliper which includes zero-adjusting means operable without any adverse effect upon the interior counter mechanism.

These and other objects of the present invention will become apparent from the following description when taken in conjunction with the accompanying drawings, which illustrate one preferred embodiment of the invention and in which.

Figure 3:
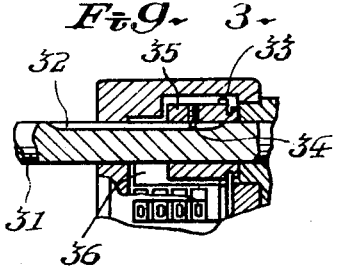
FIG. 3 is a fragmentary cross section of a conventional digital micrometer caliper, illustrating its part corresponding to that part of the inventive caliper shown in FIG. 2.

Referring to the drawings and first to FIG. 3, the typical form of conventional digital micrometer caliper includes a micrometer spindle 31 formed lengthwise thereof with a groove 32 of limited width, which groove extends parallel with the axis of the spindle 31. A sleeve 35 is slidably fitted over the latter and carries at one end a gear wheel 33, which is formed integral with the sleeve itself and serves the purpose of driving the wheel counter incorporated in the caliper frame. The counter mechanism is of the conventional structure including a number of counter wheels.

The geared sleeve 35 includes a projection 34 secured thereto so as to extend radially inwardly into the groove 32 thereby to hold the sleeve 35 against rotation relative to the spindle 31 while allowing the latter to move axially relative to the sleeve. As will be readily understood, the sleeve 35 is axially fixed in the caliper frame or held therein against movement to the left or right as viewed in FIG. 3 but is rotatable with the spindle 31 to drive the counter mechanism through the mecium of the gear 33 formed on the sleeve so that any measured length can be indicated digitally by the numerical figures carried on the counter wheels.

The groove 32 is obviously formed in the outer surface of the spindle 31 longitudinally thereof and, as shown, extends to communicate with the interior space 36 of the caliper frame, in which the counter mechanism is accommodated. With this arrangement, it will be apparent that the groove 32 is exposed in use of the caliper exteriorly of its frame allowing ingress of dust into the counter mechanism through the groove 32. Particularly when workpieces are measured while being worked or on machines, cutting oil, work chips or abrasive dust may easily enter the interior mechanism of the caliper in use. Such ingress of dust or other foreign matter apparently involves the danger of impairing the sliding surfaces of the counter mechanism and hence its operation and accuracy. In extreme cases the micrometer spindle itself is made unable to rotate.

As pointed out hereinbefore, any conventional digital type micrometer caliper has required highly skilled labor to assemble principally because of the lack of zero-adjusting mechanism. This also has involved much inconvenience in use of the caliper since it has been impossible to adjust the zero position of the counter even when the measuring faces of the micrometer spindle and anvil had been severely worn out. Obviously the same inconvenience has been unavoidable with the wear of the counter mechanism, which has been expedited by the ingress of foreign matter.

According to the present invention, such difficulties can be overcome by the following improvements in caliper structure.

First, the micrometer spindle according to the invention carries a projection formed on the outside thereof and such projection is slidably fitted in an axial groove which is formed in the inside of a sleeve fitted slidably over the micrometer spindle. It is to be noted that the groove in the sleeve is not exposed to the outside of the caliper.

Secondly, the geared sleeve structure intended to drive the counter mechanism with rotation of the micrometer spindle is made according to the invention in two interfitted sleeves, including an outer sleeve carrying at one end thereof a toothed gear formed integral therewith and an inner sleeve which corresponds to the above-described sleeve having an axial groove inside thereof. The inner sleeve carries a headed screw threaded therein to extend radially outwardly thereof. The screw is slidably fitted in a circumferential slot formed in the outer sleeve so as to allow angular displacement of the latter relative to the inner sleeve, when desired for zero adjustment of the counter mechanism while binding together the inner and outer sleeves as an integral unit in the axial direction of the micrometer spindle.

Figure 1:
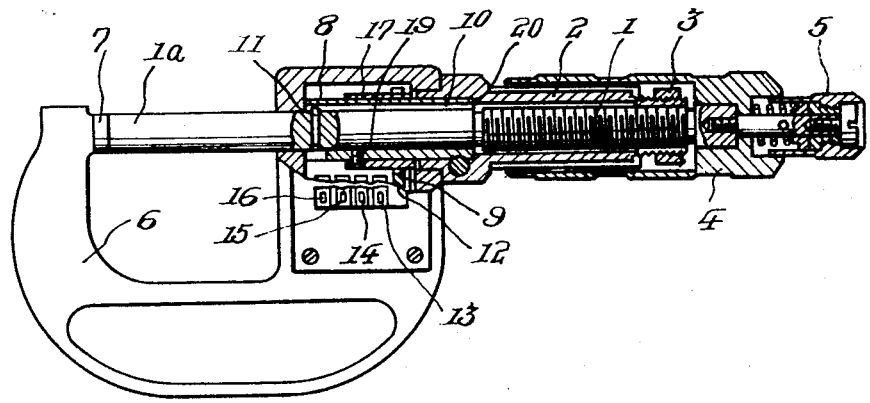
FIG. 1 represents an axial cross-sectional view of a micrometer caliper embodying the present invention.
Figure 2:
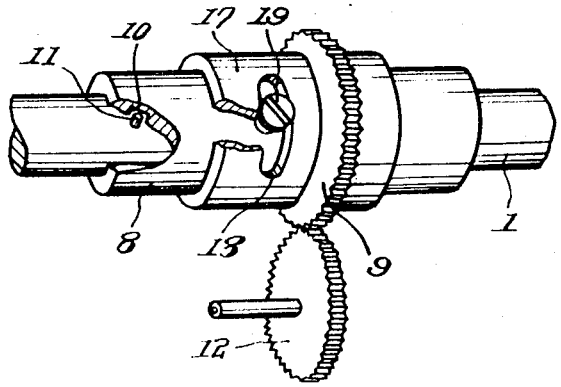
FIG. 2 represents an enlarged fragmentary perspective view illustrating the essential part of the embodiment shown in FIG. 1 with the caliper frame removed.

Referring to FIGS. 1 and 2, which illustrate one embodiment of the present invention, the reference numeral 1 indicates the micrometer spindle held in the caliper frame 6; and 2 indicates the sleeve fitted to the frame and held in threaded engagement with the spindle 1. A tapered nut 3 is fitted over the sleeve 2 at its outer end and is operable to adjust the engaging pressure between the spindle 1 and sleeve 2.

Reference numeral 4 indicates a thimble operable to rotate the spindle 1; 5 indicates a ratchet knob fitted to the thimble; and 7 indicates the anvil fixed to the frame 6 to cooperate with the micrometer spindle in measurement. The above-described members are generally similar to those used in conventional micrometer calipers and any detailed explanation of these members and their function is believed to be unnecessary.

According to the present invention, an inner sleeve 8 is fitted over the spindle 1 and held within the frame 6 against axial movement by an annular shoulder 20 formed on the caliper sleeve 2 inside thereof. A longitudinal groove 10 is formed in the inner sleeve 8 on the inside thereof to slidably receive a projection or pin 11, which is secured to the spindle 1 and extends radially outwardly thereof.

Arranged also in the frame is an outer sleeve 17 which carries at one end a toothed gear 9, formed integral with the sleeve 17. As shown in FIG. 2, this sleeve is formed in its wall with an elongate slot 18 which extends circumferentially thereof.

The inner sleeve 8 is formed with a threaded aperture to receive a headed machine screw 19, which projects from the sleeve wall radially outwardly and extends through the elongate slot 18 in the outer sleeve 17 for slidable fitting engagement therewith so that the sleeve 8 and 17 are bound together axially thereof while being allowed to rotate relative to each other when desired.

A gear 12 is rotatably supported in the frame 6 in meshing engagement with the gear 9 formed on the outer sleeve 17. Mounted on the shaft of the gear 12 are counter wheels 13, 14, 15 and 16, each of which carries on its periphery decimal figures. As is well known, the counter wheels are interconnected so as to be driven successively, the first wheel being rotatable together with the gear 12, and represent respective decimal stages. Obviously, when "9" is counted at any stage, a carry is generated and counted into the next higher stage. The frame is formed on one side thereof with a window to enable the operator to read the measured length as represented by the decimal figures on the counter wheels.

In other words, as the micrometer spindle 1 is rotated, the counter wheels 13, 14, 15 and 16 are rotated in succession from the lower to the higher stage to together indicate the measured length, i.e. the length of distance between the spindle end 1a (FIG. 1) and the anvil 7, through the frame window. For the driving connection between the successive counter wheels there are provided three gear wheels, not shown, which are arranged to allow reverse rotation of the wheels. The above-described construction of the counter mechanism is itself similar to that used in conventional digital micrometer calipers.

As described hereinbefore, the micrometer spindle 1 carries a radially outwardly projecting pin 11, which is slidably fitted in a groove 10 formed in the inside surface of the inner sleeve 8 longitudinally thereof, and the sleeve 8 is completely enclosed in the caliper frame 6. With this arrangement, it will be apparent that the groove 10 is never exposed to the outside even when the thimble 4 is turned to cause axial movement of the spindle 1 and therefore any ingress of dust or other foreign matter into the counter mechanism is completely precluded unlike the case with conventional digital micrometer calipers having a groove 32 (FIG. 3) formed in the spindle outside thereof.

Moreover, with the micrometer caliper of the invention, zero adjustment of the counter mechanism can be readily effected because of the counter-driving sleeve structure, which is comprised of inner and outer sleeves 8 and 17 respectively carrying threaded screw 19 and cooperating circumferential slot 18, as described and shown in FIGS. 1 and 2. As will be readily understood, the outer sleeve 17 can be made free to rotate relative to the inner sleeve 8 by loosening the screw 19, which is normally held tightly threaded into the inner sleeve 8 to fix the outer sleeve 17 thereto. Subsequently by turning the outer sleeve 17 while holding the spindle 1 against rotation, the counter gear 12 which is in mesh with the gear 9 carried on the outer sleeve 17, can be rotated through any desired angle together with the first counter wheel 13 for zero adjustment of the digital counter indication, as will readily be understood.

After the zero adjustment, the screw 19 is again tightly threaded into the inner sleeve 8 to fix the outer sleeve 17 thereto.

As will be apparent from the above description, the counter mechanism of the digital micrometer caliper of the present invention can be zeroadjusted with ease whenever desired to give a correct digital indication. This not only enables extended use of the micrometer caliper irrespective of the wear unavoidable with the components of the caliper but also makes it unnecessary to pay particular care in their assembling for adjustment to the zero point, enabling the caliper to be assembled without any particular skill.

It will thus be appreciated that according to the present invention, the time and labor required for assembling is substantially reduced and the service life of the caliper is marked extended with reduced maintenance.

Although one preferred embodiment of the present invention has been illustrated and described, it will be apparent to those skilled in the art that various changes and modifications may be made therein without departing from the spirit of the invention or the scope of the appended claims.

What is claimed is

1. A digital micrometer caliper of the type including a frame, a micrometer spindle supported therein, a wheel counter housed within the frame for indicating the position of the spindle relative to the frame, and a drive mechanism connecting the spindle to the counter, the caliper being characterized in that the drive mechanism comprises:
   a first sleeve located wholly within the housing and surrounding the spindle, the sleeve being restrained from longitudinal movement by the housing and having a longitudinal groove on its inner surface;
   a pin projecting radially outwardly from the spindle and received within the longitudinal groove of the sleeve; and
   gear means for transmitting the rotating motion of the sleeve to the counter.

2. The digital micrometer caliper according to claim 1 further including a second sleeve located within the housing and surrounding the first sleeve, means connecting the first and second sleeves for common rotation, and a gear connected to and rotating with the outer sleeve for driving the counter.

3. The digital micrometer caliper according to claim 2 wherein the second sleeve has a circumferentially extending slot, the connecting means including a screw extending through the slot and threaded into the first sleeve, the first and second sleeves rotating in unison when the screw is tightened and the second sleeve being capable of limited rotation relative to the first sleeve when the screw is loosened.

4. A digital micrometer caliper with a longitudinally movable and rotatable micrometer spindle positioned in the caliper frame, and a geared sleeve fitted over the micrometer spindle for rotation therewith, the sleeve being axially fixed relative to and housed in the frame, a counter mechanism driven from the sleeve for digital indication of the spindle position, characterized in that the sleeve assembly is made of inner and outer sleeves slidably fitted to each other, of which the inner sleeve has on the inner side an axially extending groove in which a radially projecting pin on the micrometer spindle engages, while the outer sleeve is provided along its periphery with a slot which the head of a radially projecting headed screw screwed into the inner sleeve engages for the releasable connection of the two sleeves and the outer sleeve carries a toothed gear for driving engagement with the counter.

* * * * *